US009667802B2

(12) United States Patent
Dwarkha et al.

(10) Patent No.: US 9,667,802 B2
(45) Date of Patent: May 30, 2017

(54) METHODS OF ASSIGNING, RECORDING AND USING A LOCATION ROUTING NUMBER

(71) Applicant: VONAGE AMERICA INC., Holmdel, NJ (US)

(72) Inventors: Rohan Dwarkha, Mendham, NJ (US); Craig Lennon, Rumson, NJ (US)

( * ) Notice: Subject to any disclaimer, the term of this patent is extended or adjusted under 35 U.S.C. 154(b) by 0 days.

(21) Appl. No.: 14/063,658

(22) Filed: Oct. 25, 2013

(65) Prior Publication Data

US 2014/0313941 A1    Oct. 23, 2014

Related U.S. Application Data

(60) Provisional application No. 61/813,528, filed on Apr. 18, 2013.

(51) Int. Cl.
*H04L 12/28* (2006.01)
*H04M 7/00* (2006.01)
*H04M 3/42* (2006.01)
*H04L 29/06* (2006.01)
*H04L 29/12* (2006.01)

(52) U.S. Cl.
CPC ...... *H04M 7/0075* (2013.01); *H04L 65/1053* (2013.01); *H04M 3/42297* (2013.01); *H04L 61/106* (2013.01); *H04Q 2213/13097* (2013.01); *H04Q 2213/13102* (2013.01); *H04Q 2213/13383* (2013.01); *H04Q 2213/13389* (2013.01)

(58) Field of Classification Search
USPC ........................................ 379/211.02, 221.13
See application file for complete search history.

(56) References Cited

U.S. PATENT DOCUMENTS

| 5,881,145 | A | * | 3/1999 | Giuhat et al. | ............ | 379/221.13 |
| 5,887,056 | A | * | 3/1999 | Sonnenberg | ............. | 379/221.13 |
| 6,078,657 | A | * | 6/2000 | Alfieri et al. | ............ | 379/220.01 |
| 7,079,529 | B1 | * | 7/2006 | Khuc | ............................ | 370/352 |
| 8,031,856 | B2 |  | 10/2011 | Mikleton et al. |  |  |
| 2001/0016039 | A1 | * | 8/2001 | Slutsman et al. | ........ | 379/221.13 |

* cited by examiner

*Primary Examiner* — Duc C Ho
(74) *Attorney, Agent, or Firm* — Nixon & Vanderhye P.C.; Joseph Pagnotta

(57) ABSTRACT

An IP telephony system obtains control over a group of telephone numbers that can be assigned to its customers' telephony devices under a contract with a first local exchange carrier that originally controlled the group of telephone numbers. The first local exchange carrier assigns one or more location routing numbers to the group of telephone numbers, and the one or more location routing numbers are for the exclusive use of the IP telephony system. The one or more location routing numbers are then recorded against the group of telephone numbers in a local number portability database. Other exchange carriers are then caused to route calls directed to the any telephony number associated with the one or more location routing numbers directly to the IP telephony system. As a result, a second local exchange carrier can terminate telephony communications directly to the IP telephony system, bypassing the first local exchange carrier.

20 Claims, 3 Drawing Sheets

METHODS OF ASSIGNING, RECORDING AND USING A LOCATION ROUTING NUMBER

This application claims priority to the filing date of U.S. Provisional Application No. 61/813,528, filed Apr. 18, 2013, the entire contents of which is hereby incorporated by reference.

BACKGROUND OF THE INVENTION

The invention is related to routing telephony communications directed to customers of an Internet Protocol (IP) telephony service provider. An IP telephony service provider is capable of offering telephony services to its customers that are highly similar to the services offered by traditional telephony service providers. For example, an IP telephony service provider can assign a telephone number to a customer and/or the customer's telephony devices. The IP telephony service provider can then connect an outgoing telephone call placed by the customer to another telephone number served by the IP telephony service provider, or by any other telephony service provider. The IP telephony service provider can also connect an incoming call directed to a customer's telephone number to one or more of the customer's telephony devices.

In the United States, groups or blocks of telephone numbers are assigned to individual local exchange carriers, and the local exchange carriers then assign individual telephone numbers to their customers. Because an IP telephony service provider is not a typical local exchange carrier, groups of telephone numbers are not directly assigned to IP telephony service providers. Instead, an IP telephony service provider must obtain control over a group of telephone numbers via a contractual agreement with a local exchange carrier to which the group of telephone numbers were originally assigned. The IP telephony service provider can then assign the telephone numbers to its customers.

At one point in time, a customer's telephone number was indicative of the identity of carrier that assigned and controlled the telephone number. As a result, when a first carrier was attempting to route an outgoing telephone call for one of its customers that was directed to a telephone number controlled by a second carrier, simply examining the telephone number to which the call was directed provided an indication of the identity of the second carrier. This made it easy for the first carrier to determine how to route the call.

In the recent past, however, legislation in the United States mandated that a customer be capable of retaining a telephone number assigned to them when the customer switches from a first telephony service provider to a second telephony service provider. One consequence of this change is that a customer's telephone number is now not necessarily indicative of the identity of the carrier that currently provides the customer with its telephony service.

For example, a customer could sign up for telephony service with a first telephony service provider, and the first telephony service provider would assign one of the telephone numbers it controls to the customer. Later, the customer could switch to a second telephony service provider, but retain the telephone number originally assigned by the first telephony service provider. When a third telephony service provider attempts to send a call to the customer, the third telephony service provider must be made aware that the first telephony service provider that originally controlled and assigned the telephone number is no longer capable of completing a call to that telephone number. Instead, the third telephony service provider needs to direct the call to the second telephony service provider.

To address this issue, local number portability databases were established. When control of a telephone number is switched from a first telephony service provider to a second telephony service provider, an entry for the telephone number is made in the local number portability databases. The entry includes a "location routing number" which is associated with that telephone number. The location routing number is a ten digit number that resembles a telephone number, but is not a telephone number. Instead, the location routing number provides an indication of the identity of the telephony service provider that currently provides service to the telephone number. More specifically, the location routing number can be indicative of the identity of a switch or gateway that services the telephone number and which is capable of terminating an incoming telephony communication to the telephone number.

Now, whenever a carrier needs to send a telephony communication to a called telephone number, the carrier first checks the local number portability database to determine if there is an entry for the called telephone number. If not, this means that the telephone number is still being serviced by the telephony service provider that originally assigned the telephone number. As a result, the telephone number itself will provide an indication of the identity of the telephony service provider capable of terminating the telephony communication to the called telephone number.

On the other hand, if there is an entry for the called telephone number in the local number portability database, this means that the telephone number is now being serviced by a telephony service provider other than the one which originally assigned the called telephone number. In this instance, the entry in the local number portability database for the called telephone number will include a location routing number. And the location routing number corresponding to the called telephone number will provide an indication of the identity of the telephony service provider capable of terminating the telephony communication to the called telephone number.

As mentioned above, when an IP telephony service provider wishes to assign a telephone number to one of its customers, the IP telephony service provider must first obtain control of a telephone number from a first local exchange carrier. If there is an entry in the local number portability databases for the telephone number, the entry will include a location routing number that identifies the first local exchange carrier.

When a calling party utilizing a second local exchange carrier dials the telephone number of the customer of the IP telephony service provider, the second local exchange carrier consults the local number portability database for the called number, and finds an entry which includes a location routing number identifying the first local exchange carrier. As a result, the second local exchange carrier sends the call to the first local exchange carrier. The first local exchange carrier determines that the call is for a customer of the IP telephony service provider, so the first local exchange carrier passes the call along to the IP telephony service provider. The IP telephony service provider then terminates the call to its own customer which has been assigned the called telephone number.

While this sequence of steps results in the call ultimately being connected to the called party, the process is inefficient. The call is routed from the second local exchange carrier to the first local exchange carrier, and then from the first local exchange carrier to the IP telephony service provider. The interim step of routing the call through the first local exchange carrier can delay the call setup. In addition, the IP telephony service provider may be forced to compensate the first local exchange carrier for re-routing the call. It would be desirable to have the call sent directly from the second local exchange carrier to the IP telephony service provider. Doing so would result in a faster call setup. A direct connection would also avoid burdening the first local exchange carrier with re-routing the call, freeing the assets of the first local exchange carrier for other tasks. Moreover, it is potentially less expensive if the assets of the first local exchange carrier are not used to route the call to the called party.

DETAILED DESCRIPTION OF PREFERRED EMBODIMENTS

The following detailed description of preferred embodiments refers to the accompanying drawings, which illustrate specific embodiments of the invention. Other embodiments having different features do not depart from the scope of the present invention.

In the following description, the terms IP telephony service provider, VOIP system, VOIP telephony system, IP system and IP telephony system are all intended to refer to a system that connects callers and that delivers data, text or video communications using Internet protocol data communications.

The foregoing and following descriptions also reference local exchange carriers and telephony service providers. A local exchange carrier can be a telephony service provider. Also, an entity known to those of ordinary skill in the art as a competitive local exchange carrier can also be a telephony service provider. For purposes of these descriptions, the term local exchange carrier is intended to encompass both traditional local exchange carriers and competitive local exchange carriers. The term local exchange carrier also encompasses a telephony service provider.

Figure 1:
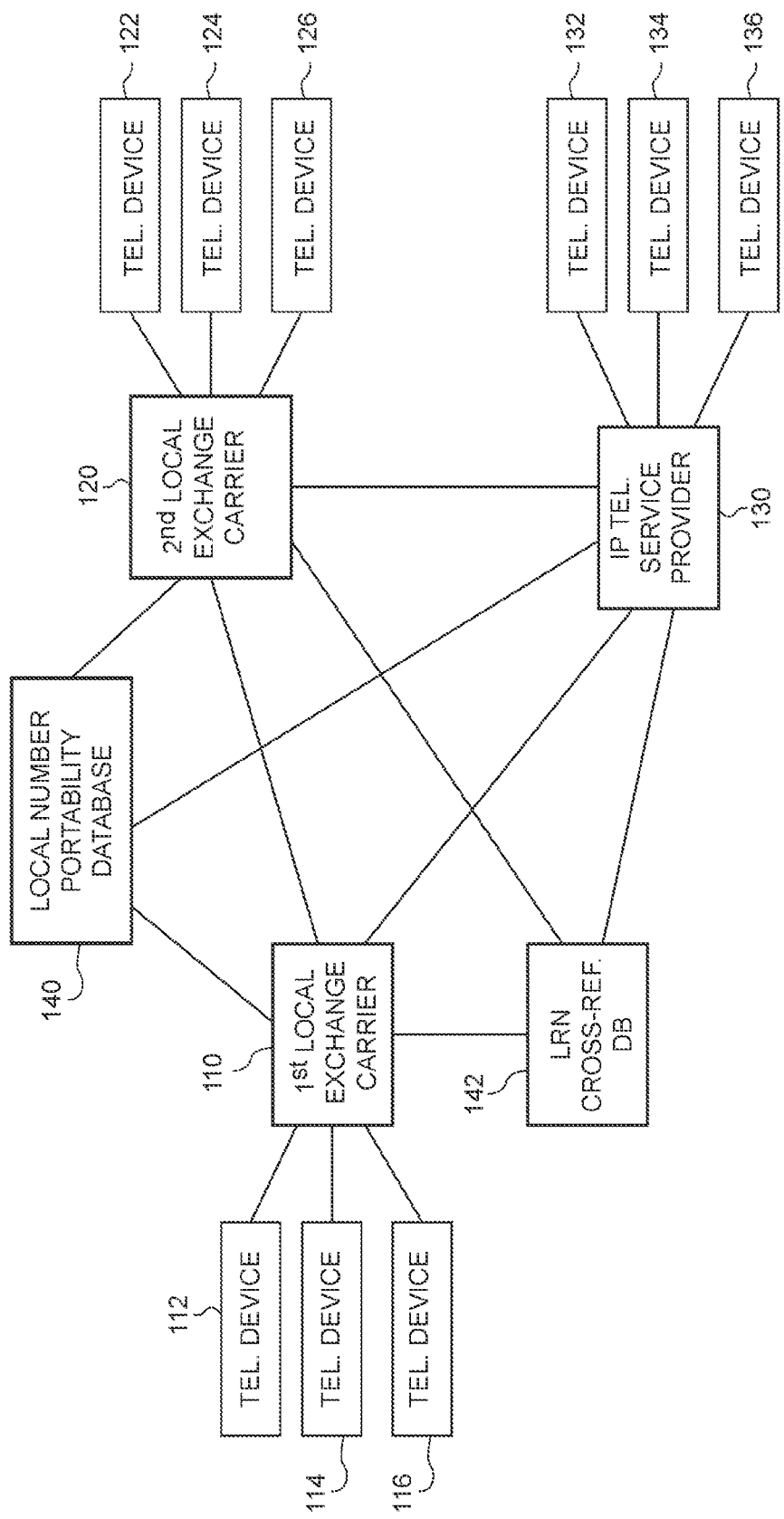
FIG. 1 is a diagram of a communications environment that includes local exchange carriers and an IP telephony service provider.

FIG. 1 illustrates a communications environment that includes multiple telephony service providers, each of which provide telephony services to its customers. A first local exchange carrier 110 provides telephony services to customers using telephony devices 112, 114, 116. A second local exchange carrier also provides telephony services to customers who use multiple telephony devices 122, 124, 126. An IP telephony service provider 130 provides telephony services to its customers who use multiple telephony devices 132, 134, 136.

The first local exchange carrier 110, the second local exchange carrier 120 and the IP telephony service provider 130 are all capable of accessing a local number portability database 140, as discussed above. Although only a single block is illustrated to represent the local number portability database, those of ordinary skill in the art will appreciate that multiple copies of the local number portability database could be stored on multiple different physical devices located at various different geographical locations.

The lines appearing in FIG. 1 that connect the first local exchange carrier 110, the second local exchange carrier 120, the IP telephony service provider 130 and the local number portability database 140 are intended to represent functional connections between these elements. The connections could be implemented via private data networks and public data networks, such as the Internet.

The IP telephony service provider 130 communicates with the telephony devices 132, 134, 136 of its customers via data communications that pass over a data network. The data network is commonly the Internet, however, private data networks may form all or a portion of the data communication path. The customer telephony devices 132, 134, 136 could be IP telephony devices that are coupled to a data network, or normal analog telephones that are connected to a data network via a terminal adapter. Alternatively, a customer telephony device 132, 134, 136 could be a computer that is running IP telephony software. In addition, a customer's mobile computing device which is running IP telephony software could also comprise one of the customer telephony devices 132, 134, 136. The mobile computing device could accesses the Internet via a wireless data network interface, such as a WiFi or WiMax router. Alternatively, a mobile telephony device may access the Internet via a data channel provided by a cellular telephony system. Moreover, certain devices that are not traditionally used as telephony devices may act as telephony devices once they are configured with appropriate client software. One example would be a desktop or a laptop computer that is running software that can interact with an IP telephony system over a data network to conduct telephone calls. Another example would be a portable computing device, such as an Apple iPod Touch™, which includes a speaker and a microphone. A software application loaded onto an Apple iPod Touch™ can be run so that the Apple iPod Touch™ can interact with an IP telephony system to conduct a telephone call.

The foregoing and following descriptions refer to telephony communications and telephony activity. These terms are intended to encompass all types of telephony communications, regardless of whether all or a portion of the communications are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

As mentioned above, and with reference to FIG. 1, it is possible for an IP telephony service provider 130 to obtain control over a group of telephone numbers that were originally assigned to a first local exchange carrier 110. Via a contractual arrangement, the first local exchange carrier 110 cedes control over the group of telephone numbers to the IP telephony service provider 130. The IP telephony service provider 130 then assigns the telephone numbers to its customers. Specifically, the IP telephony service provider 130 assigns a first of the telephone numbers to a first customer using a first telephony device 132, assigns a second of the telephone numbers to a second customer using a second telephony device 134, and assigns a third of the telephone numbers to a third customer that uses a third telephony device 136.

Under the normal convention, to the extent any location routing number is associated with the group of telephone numbers now controlled by the IP telephony service provider 130, the location routing number would point to the first local exchange carrier 110, and/or to a switch or gateway controlled by the first local exchange carrier 110. The location routing number would be recorded in a local number portability database 140 against each of the telephone numbers now assigned to the customers of the IP telephony service provider 130.

When a calling party utilizing a telephony device 122 coupled to a second local exchange carrier 120 dials the telephone number of a customer of the IP telephony service provider 130, the second local exchange carrier 120 consults the local number portability database 140 for the dialed number, and finds an entry which includes the location routing number identifying the first local exchange carrier 110. For this reason, the second local exchange carrier 120 routes the telephony communication to the first local exchange carrier 110. The first local exchange carrier 110 determines that the telephony communication is directed to a telephone number now controlled by the IP telephony service provider 130, so the first local exchange carrier 110 routes the telephony communication to the IP telephony service provider 130. The IP telephony service provider 130 then terminates the call to its own customer which has been assigned the dialed telephone number.

One way to eliminate the first local exchange carrier 110 from this routing process is for the first local exchange carrier 110 to assign a location routing number for the exclusive use of the IP telephony service provider 130. This exclusive location routing number is then recorded in the local number portability database 140 against the telephone numbers that are controlled by the IP telephony service provider 130 and that are assigned to customers of the IP telephony service provider 130.

The IP telephony service provider 130 then establishes a contractual routing arrangement with the second local exchange carrier 120 that causes the second local exchange carrier 120 to route telephony communications directly to the IP telephony service provider 130 each time that a telephony communication is directed to a telephone number that is associated with the unique location routing number assigned to the IP telephony service provider 130.

For example, when a user of a telephony device 122 coupled to the second local exchange carrier 120 dials a telephone number of the telephony device 132 coupled to the IP telephony service provider 130, the second local exchange carrier 120 consults the local number portability database 140 to determine if a location routing number is associated with the dialed telephone number. The second local exchange carrier 120 would find that the unique location routing number assigned to the IP telephony service provider 130 is recorded in the local number portability database 140 against the dialed telephone number. And rather than routing the telephony communication to the first local exchange carrier 110, who is normally associated with that location routing number, the second local exchange carrier 120 instead routes the telephony communication directly to the IP telephony service provider 130 in accordance with the terms of the contractual routing arrangement established between the IP telephony service provider 130 and the second local exchange carrier 120. This eliminates the first local exchange carrier 110 from the routing path, which make the routing process faster, and potentially less expensive.

The IP telephony service provider 130 can enter into such contractual routing arrangements with any number of different exchange carriers. Once such a contractual routing arrangement is in place with an exchange carrier, anytime that the exchange carrier needs to route a telephony communication to a telephone number associated with a unique location routing number assigned to the IP telephony service provider 130, the telephony communication is routed from the exchange carrier directly to the IP telephony service provider 130, bypassing the first local exchange carrier 110.

Moreover, it is possible for multiple location routing numbers to be uniquely assigned to the IP telephony service provider 130. And the contractual routing arrangements established with the exchange carriers can provide that all telephony communications directed to any telephone number that is associated with any of those unique location routing numbers be routed directly to the IP telephony service provider 130.

For example, the IP telephony service provider 130 could obtain control over a first group of telephone numbers that were originally assigned to the first local exchange carrier 110 via a contractual arrangement with the first local exchange carrier 110. The first local exchange carrier 110 then assigns a first unique location routing number to the IP telephony service provider 130, and the first local exchange carrier 110 causes the first unique location routing number to be recorded in the local number portability database 140 against each of the telephone numbers in the first group.

The IP telephony service provider 130 could thereafter obtain control over a second group of telephone numbers that were originally assigned to the first local exchange carrier 110 via a second contractual arrangement with the first local exchange carrier 110. The first local exchange carrier 110 then assigns a second unique location routing number to the IP telephony service provider 130, and the first local exchange carrier 110 causes the second unique location routing number to be recorded in the local number portability database 140 against each of the telephone numbers in the second group.

The IP telephony service provider 130 also could obtain control over a third group of telephone numbers that were originally assigned to the second local exchange carrier 120 via a contractual arrangement with the second local exchange carrier 120. The second local exchange carrier 120 then assigns a third unique location routing number to the IP telephony service provider 130, and the second local exchange carrier 120 causes the third unique location routing number to be recorded in the local number portability database 140 against each of the telephone numbers in the third group.

At this point, first, second and third location routing numbers will have been assigned to the IP telephony service provider 130 for its exclusive use, and the first, second and third location routing numbers will be recorded in the local number portability database 140 against various different telephone numbers that are assigned to customers of the IP telephony service provider 130.

The IP telephony service provider 130 can then establish contractual routing arrangements with the first local exchange carrier 110, the second local exchange carrier 120 and other local exchange carriers. All of the contractual routing arrangements would provide that anytime an exchange carrier is attempting to route a telephony communication to a telephone number that is associated with any of the first, second and third location routing numbers, the telephony communication is to be routed directly to the IP telephony service provider 130.

Establishing such contractual routing arrangements with exchange carriers is advantageous for the IP telephony service provider 130 because the routing arrangements can result in the faster connection of calls to the customers of the IP telephony service provider 130, and because the routing arrangements may decrease the overall cost of providing telephony services. However, there is a certain burden associated with establishing the contractual routing arrangements.

Also, over time, the IP telephony service provider 130 may acquire control over new telephone numbers associated with new unique location routing numbers. Likewise, the IP telephony service provider may discontinue service to some groups of telephone numbers, and cede control over those groups of telephony numbers back to the local exchange carrier that originally provided the telephone numbers. In both instances, it will be necessary to periodically update the contractual routing arrangements with the local exchange carriers when new location routing numbers are uniquely assigned to the IP telephony service provider 130, and/or when control over a location routing number that was uniquely assigned to the IP telephony service provider 130 is ceded back to the local exchange carrier that originally assigned the location routing number to the IP telephony service provider 130. There is also a burden associated with ensuring that the contractual routing arrangements with local exchange carriers are kept up-to-date with the latest list of location routing numbers that are uniquely assigned to the IP telephony service provider 130.

In the United States, telephone numbers have ten digits. Many exchange carriers utilize routing tables that provide an indication of how to route telephony communications. However, the routing tables often do not extend to the full ten digits. Instead, many routing tables only extend to a few digits, or only as many as six. The assumption is that any telephony communication directed to a telephone number that begins with a certain six digit pattern can be completed by a carrier that serves the physical area corresponding to those first six digits, regardless of what the last four digits are.

For this reason, it would be desirable for an IP telephony service provider to take control of telephone numbers from a local exchange carrier in blocks that represent all telephone numbers which begin with the same six digits. Once this occurs, the IP telephony service provider can then enter into routing agreements with local exchange carriers that specify that all telephony communications directed to telephone numbers beginning with that certain six digit pattern should be directly routed to the IP telephony service provider. And because many exchange carriers have routing tables that only extend to six digits, this will be operationally possible for the exchange carriers.

In contrast, it might be operationally impossible for an exchange carrier to agree to directly route telephony communications directed to telephone numbers beginning with the same seven digits, if the exchange carrier utilizes routing tables that only extend to six digits. Thus, ensuring that the IP telephony service provider acquires control over blocks of telephone numbers which include all telephone numbers that begin with the same six digits makes it possible for the IP telephony service provider to enter into direct routing agreements with even those exchange carriers who utilize routing tables that only extend to six digits.

It may be possible to largely eliminate the burdens associated with creating and maintaining contractual routing arrangements with exchange carriers using various different methods.

In some embodiments, the entity that assigns location routing numbers updates the identity of the local exchange carrier or telephony services provider associated with a location routing number whenever the location routing number is assigned to a new entity. This information is then made publically available to all exchange carriers.

For example, when the first local exchange carrier 110 cedes control over a group of telephone numbers to the IP telephony service provider 130, the first local exchange carrier also assigns a unique location routing number to the IP telephony service provider 130, and has that unique location routing number recorded in the local number portability database 140 against each of the telephone numbers in the group. The first local exchange carrier 110 also informs the entity responsible for assigning location routing numbers that the location routing number recorded against the group of telephone numbers is now assigned for the exclusive use of the IP telephony service provider 130. The entity responsible for assigning location routing numbers adjusts its public records to reflect that the IP telephony service provider 130 is now associated with that location routing number, and this information is published so that all local exchange carriers are in possession of this new information.

Once the above actions have occurred, when a local exchange carrier is attempting to route a telephony communication to a telephone number within the group recently assigned to the IP telephony service provider 130, the local exchange carrier consults the local number portability database 140 and learns that the unique location routing number now assigned to the IP telephony service provider 130 is associated with that telephone number. And because the local exchange carrier will have been notified that the location routing number is now assigned to the IP telephony service provider 130, the local exchange carrier will know to route the telephony communication directly to the IP telephony service provider 130.

In other embodiments, a location routing number cross-reference database 142 is established. The location routing number cross-reference database lists the current entity in control of individual location routing numbers, which may differ from the entity to which the location routing numbers were originally assigned. The location routing number cross-reference database 142 may only list the location routing numbers which have been re-assigned from a first telephony services provider to a second telephony services provider.

When the IP telephony service provider 130 acquires control over a group of telephone number originally assigned to and controlled by the first local exchange carrier 110, the first local exchange carrier 110 assigns a unique location routing number to the IP telephony service provider 130 that is to be associated with the group of telephone numbers. The first local exchange carrier 110 records the unique location routing number against each of the telephone numbers in the group in the local number portability database 140. At that point, either the first local exchange carrier 110, or the IP telephony service provider 130 can make an entry in the location routing number cross-reference database 142 that indicates that the IP telephony service provider 130 is now associated with the unique location routing number. This information is readily accessible to local exchange carriers responsible for routing telephony communications.

Once the above actions have occurred, when a local exchange carrier is attempting to route a telephony communication to a telephone number within the group recently assigned to the IP telephony service provider 130, the local exchange carrier first consults the local number portability database 140 and learns that the unique location routing number now assigned to the IP telephony service provider 130 is associated with that telephone number. The local exchange carrier next consults the location routing number cross-reference database 142 to determine whether control of the unique location routing number still resides with the entity to which it was originally assigned, or to some other entity. In this instance, the local exchange carrier learns that the unique location routing number is now under the control of the IP telephony service provider 130. Thus, the local exchange carrier will know to route the telephony communication directly to the IP telephony service provider 130.

In yet another embodiment, information is inserted into the local number portability database 140 that indicates the identity of the entity now controlling individual telephone numbers. For example, if the IP telephony service provider 130 acquires control over a group of telephone numbers originally assigned to and controlled by the first local exchange carrier 110, the first local exchange carrier 110 may assign a unique location routing number to the IP telephony service provider 130 that is to be associated with the group of telephone numbers. The first local exchange carrier 110 would record the unique location routing number against each of the telephone numbers in the group in the local number portability database 140. However, the first local exchange carrier 110 might also record additional information against each of the telephone numbers in the group. The additional information would identify the IP telephony service provider 130. For example, the first local exchange carrier 110 could record the name of the IP telephony service provider against each telephone number in the group. Alternatively, the first local exchange carrier 110 could record information against each telephone number in the group that identifies one or more switches, servers or gateways of the IP telephony service provider 130, such as Internet Protocol addresses of such assets.

In alternate embodiments, the IP telephony service provider 130 may be empowered to record information in the local number portability database 140 for each of the telephone numbers under its control. Again, this information could identify the IP telephony service provider 130, or the information could identify one or more switches, servers or gateways of the IP telephony service provider 130.

In some instances, the IP telephony service provider 130 may only be empowered to record information against telephone numbers that are associated with a unique location routing number that has been assigned to the IP telephony service provider 130. Thus, having the first local exchange carrier 110 assign a unique location routing number to the IP telephony service provider 130, and record that unique location routing number in the local number portability database 140 against each of the telephone numbers now being controlled by the IP telephony service provider 130 is the mechanism by which the IP telephony service provider is given permission to record identifying information in the local number portability database 140 against those telephone numbers.

Once the above actions have occurred, if the second local exchange carrier 120 is attempting to connect a telephone call placed by one of its customers to a telephone number controlled by the IP telephony service provider 130, the second local exchange carrier 120 will consult the local number portability database 140 for an entry corresponding the dialed telephone number. The entry in the local number portability database 140 for that dialed telephone number will include information pointing to the IP telephony service provider 130, or to a switch, server or gateway controlled by the IP telephony service provider 130. Thus, the second local exchange carrier 120 will know to directly route the telephony communication to the IP telephony service provider 130.

In the embodiment discussed immediately above, it was assumed that when the first local exchange carrier 110 cedes control over a group of telephone numbers to the IP telephony service provider 130, the first local exchange carrier 110 would assign a unique location routing number to the IP telephony service provider 130, and record that unique location routing number in the local number portability database 140 against each of the telephone numbers in the group. Then, either the first local exchange carrier 110 or the IP telephony service provider 130 would record information in the local number portability database 140 against each of the telephone numbers in the group to identify or somehow point to the IP telephony service provider 130. However, if information pointing to or otherwise identifying the IP telephony service provider is recorded in the local number portability database 140 against each of the telephone numbers in the group, it may be unnecessary to even assign a unique location routing number to IP telephony service provider 130. Thus, in alternate embodiments, when the first local exchange carrier 110 cedes control over a group of telephone numbers to the IP telephony service provider 130, the first local exchange carrier may simply record information in the local number portability database 140 against each of the telephone numbers in the group that points to or otherwise identifies the IP telephony service provider 130, or an asset of the IP telephony service provider 130.

Figure 2:
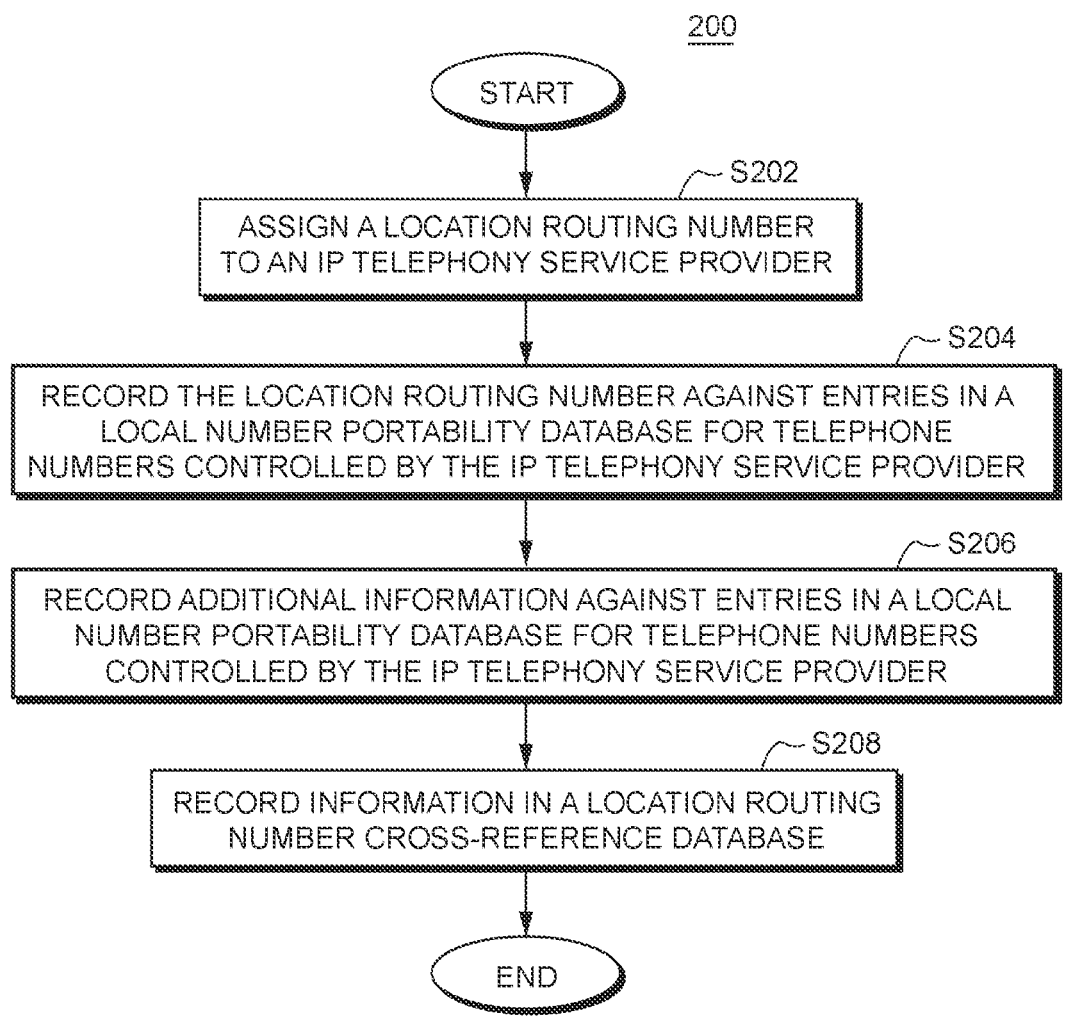
FIG. 2 is flowchart illustrating steps of a method that would be performed to assign a location routing number to an IP telephony service provider, and to record that location routing number in a local number portability database against the telephone numbers controlled by the IP telephony service provider.

FIG. 2 illustrates steps of a method 200 of configuring entries in a local number portability database for telephone numbers controlled by an IP telephony service provider such that the entries provide information that can be used to route telephony communications directed to those telephone numbers directly to the IP telephony service provider. This method is performed after the IP telephony service provider has acquired control over a group of telephone numbers under a contractual arrangement with a local exchange carrier that originally controlled the telephone numbers.

The method 200 begins and proceeds to step S202, where a location routing number is assigned for exclusive use by the IP telephony service provider. In step S204, entries in one or more local number portability databases corresponding to the telephone numbers controlled by the IP telephony service provider are modified to include the assigned location routing number. This step may include creating entries in the local number portability databases for the telephone numbers controlled by the IP telephony service provider.

In some embodiments, the method would end after step S204 has been performed. In alternate embodiments, the method may include an additional step S206, where additional information is recorded in the local number portability database against the entries for the telephone numbers controlled by the IP telephony service provider. The additional information would identify the IP telephony service provider as being in control of the telephone numbers. The additional information could be an identifier that corresponds to the IP telephony service provider. Alternatively, or in addition, the information could identify assets of the IP telephony service provider that can be used to route telephony communications. For example, the information could identify a routing server or routing gateway of the IP telephony service provider. The information could be an IP address of an asset of the IP telephony service provider.

Here again, the method could end after step S206 has been performed. However, in alternate embodiments, the method may further include a step S208 of recording information in a location routing number cross-reference database. As explained above, the location routing number cross-reference database could have entries for individual location routing numbers, and the information recorded against each location routing number could indicate the identity of a telephony service provider to which the location routing number is assigned, or the identity of a telephony services provider which currently has control of the location routing number. In alternate embodiments, the information recorded against each location routing number could identify assets of a telephony services provider which are capable of routing telephony communications that are directed to telephone numbers associated with the location routing number, such as an IP address of a routing server or routing gateway.

In some embodiments, a method as generally illustrated in FIG. 2 could include only steps S202, S204 and S208-step S206 being an optional omitted step.

Figure 3:
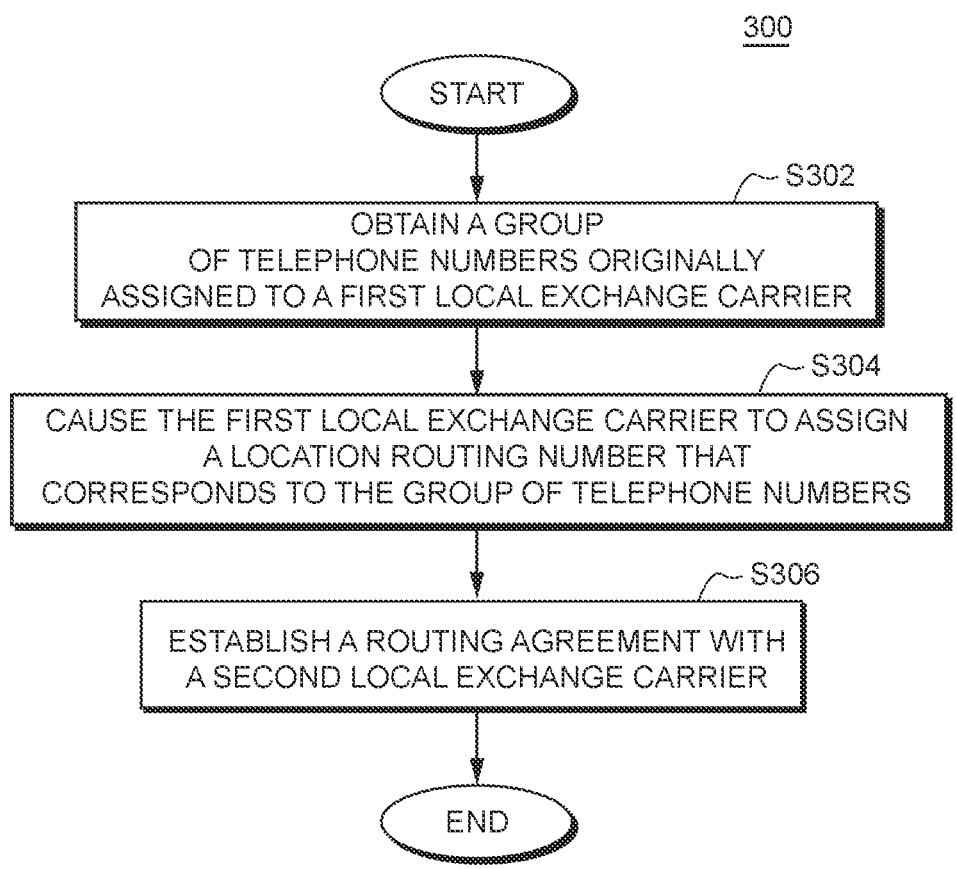
FIG. 3 is a flowchart illustrating steps of a method that would be performed by an IP telephony service provider to facilitate the direct routing of telephony communications to its customers.

FIG. 3 illustrates steps of a method 300 that would be performed by an IP telephony service provider to obtain control over a group of telephone numbers, and to facilitate the direct routing telephony communications directed to those telephone numbers to its customers. The method 300 begins and proceeds to step S302 where the IP telephony service provider obtains control over a group of telephone numbers that were originally controlled by a first local exchange carrier. The IP telephony service provider could obtain control over a group of telephone numbers via a contractual agreement with a local carrier that was originally assigned the group of telephone numbers. The IP telephony service provider then assigns the telephone numbers to its customers.

In step S304, the IP telephony service provider causes the first local exchange carrier to assign a location routing number for exclusive use by the IP telephony service provider. The location routing number is associated with the group of telephone numbers. In some instances, it may be necessary to record information in a local number portability database so that the assigned location routing number is recorded against each of the telephone numbers in the group. In other instances, this association in local number portability databases may already exist.

In step S306, the IP telephony service provider establishes a routing agreement with a second local exchange carrier. The routing agreement provides that the second local exchange carrier will route telephony communications directed to telephone numbers in the group directly to the IP telephony service provider. This is accomplished by having the second local exchange carrier route such telephony communication directly to the IP telephony service provider anytime that the second local exchange carrier is trying to route a telephony communication to a telephone number that is associated with the assigned location routing number.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of recording information in a local number portability database, comprising:
    ceding control over a group of telephone numbers to an Internet Protocol (IP) telephony service provider, where the group of telephone numbers were previously assigned to and controlled by a second telephony service provider, and where the group of telephone numbers remain assigned to the second telephony service provider;
    assigning a location routing number for exclusive use by the IP telephony service provider that controls the group of telephone numbers; and
    recording the assigned location routing number in entries of a local number portability database for the telephone numbers controlled by the IP telephony service provider.

2. The method of claim 1, wherein the assigning step comprises assigning a location routing number for an IP telephony service provider that can only obtain control of telephone numbers via an agreement with another telephony service provider.

3. The method of claim 1, wherein the assigning step is performed by the second telephony service provider.

4. The method of claim 3, wherein the recording step is also performed by the second telephony service provider.

5. The method of claim 3, wherein the second telephony service provider is a competitive local exchange carrier.

6. The method of claim 1, further comprising recording additional information identifying the IP telephony service provider, or an asset of the IP telephony service provider, in the entries of the local number portability database corresponding to the group of telephone numbers controlled by the IP telephony service provider.

7. The method of claim 1, further comprising recording information identifying a switching or routing unit of the IP telephony service provider in the entries of the local number portability database corresponding to the group of telephone numbers controlled by the IP telephony service provider.

8. The method of claim 7, wherein the step of recording information identifying a switching or routing unit of the IP telephony service provider in the entries of the local number portability database is performed by the IP telephony service provider.

9. The method of claim 7, wherein the information identifying a switching or routing unit of the IP telephony service provider includes an Internet Protocol (IP) address of a routing server controlled by the IP telephony service provider.

10. The method of claim 1, wherein the assigning step comprises assigning a location routing number that corresponds to all telephone numbers that begin with a predetermined number of the same digits.

11. The method of claim 1, wherein the assigning step comprises assigning a location routing number that corresponds to all telephone numbers that begin with the same six digits.

12. The method of claim 1, further comprising recording information in a location routing number cross-reference database, the information indicating that the IP telephony service provider is associated with the assigned location routing number.

13. A method performed by an Internet Protocol (IP) telephony service provider for facilitating the routing of incoming telephony communications, comprising:

obtaining, from a first local exchange carrier, control of a plurality of telephone numbers, wherein the plurality of telephone numbers remain assigned to the first local exchange carrier, but where the IP telephony service provider controls the plurality of telephone numbers;

causing the first local exchange carrier to assign a location routing number that corresponds to the plurality of telephone numbers for exclusive use by the Internet Protocol (IP) telephony service provider; and establishing a routing agreement with at least one second local exchange carrier, the routing agreement causing the second local exchange carrier to route telephony communications directed to all telephone numbers associated with the location routing number directly to the IP telephony service provider.

14. The method of claim 13, wherein the IP telephony service provider can only obtain control of telephone numbers via an agreement with another telephony service provider.

15. The method of claim 13, further comprising causing the first local exchange carrier to record the assigned location routing number in a local number portability database against the plurality of telephone numbers.

16. The method of claim 15, further comprising causing additional information to be recorded in the entries of the local number portability database for the plurality of telephone numbers, the additional information identifying the IP telephony service provider, or an asset of the IP telephony service provider.

17. The method of claim 15, further comprising causing additional information to be recorded in the entries of the local number portability database for the plurality of telephone numbers, the additional information identifying a switching or routing unit of the IP telephony service provider.

18. The method of claim 17, wherein the additional information identifying a switching or routing unit of the IP telephony service provider includes an Internet Protocol (IP) address of a routing server controlled by the IP telephony service provider.

19. The method of claim 13, wherein the obtaining step comprises obtaining control of all telephone numbers that begin with a predetermined number of the same digits.

20. The method of claim 13, wherein the wherein the obtaining step comprises obtaining control of all telephone numbers that begin with the same six digits.

* * * * *